United States Patent
Baba et al.

(10) Patent No.: US 10,486,564 B2
(45) Date of Patent: Nov. 26, 2019

(54) SEAT FOR AUTOMOBILE

(71) Applicant: Adient Luxembourg Holding S.À.R.L., Luxembourg (LU)

(72) Inventors: Kaoru Baba, Yokohama (JP);
Yoshihisa Hamano, Yokohama (JP);
Yuichi Tanimoto, Yokohama (JP)

(73) Assignee: Adient Luxembourg Holding S.À.R.L., Luxembourg (LU)

( * ) Notice: Subject to any disclaimer, the term of this patent is extended or adjusted under 35 U.S.C. 154(b) by 187 days.

(21) Appl. No.: 15/514,192

(22) PCT Filed: Sep. 26, 2014

(86) PCT No.: PCT/JP2014/075678
§ 371 (c)(1),
(2) Date: Mar. 24, 2017

(87) PCT Pub. No.: WO2016/046969
PCT Pub. Date: Mar. 31, 2016

(65) Prior Publication Data
US 2017/0297467 A1    Oct. 19, 2017

(51) Int. Cl.
*B60N 2/64*    (2006.01)
*B60N 2/58*    (2006.01)
(Continued)

(52) U.S. Cl.
CPC .............. *B60N 2/643* (2013.01); *B60N 2/58* (2013.01); *B60N 2/5883* (2013.01); *B60N 2/60* (2013.01);
(Continued)

(58) Field of Classification Search
CPC . B60N 2/58; B60N 2/60; B60N 2/643; B60N 2/686; B60N 2/609; B60N 2/5883; B60N 2/64
(Continued)

(56) References Cited

U.S. PATENT DOCUMENTS 4,643,480 A * 2/1987 Morita ..................... B60N 2/70
297/226
5,826,938 A * 10/1998 Yanase .................. B60R 21/207
297/216.13
(Continued)

FOREIGN PATENT DOCUMENTS

CN    1810549 A    8/2006
CN    103129435 A    6/2013
(Continued)

OTHER PUBLICATIONS

International Search Report in corresponding International Application No. PCT/JP2014/075678 dated Dec. 16, 2014, 4 pages.
(Continued)

*Primary Examiner* — Milton Nelson, Jr.
(74) *Attorney, Agent, or Firm* — Foley & Lardner LLP

(57) ABSTRACT

A seat for automobile in which a back board equipped with a base material and a cover for covering that base material is attached to a back side of a seat back, wherein the back board has a first region in which a first member of the base material is set, and a second region that is softer than the first region, and a coupling member for coupling the back board to the seat back is attached to the second region.

6 Claims, 10 Drawing Sheets

(51) Int. Cl.
*B60N 2/60* (2006.01)
*B60N 2/68* (2006.01)

(52) U.S. Cl.
CPC ............ *B60N 2/609* (2013.01); *B60N 2/64* (2013.01); *B60N 2/686* (2013.01)

(58) Field of Classification Search
USPC .......................... 297/452.62, 219.1, 452.38
See application file for complete search history.

(56) References Cited

U.S. PATENT DOCUMENTS

| | | | | |
|---|---|---|---|---|
| 5,895,096 | A * | 4/1999 | Massara | B60N 2/70 297/452.18 |
| 6,935,685 | B2 * | 8/2005 | Kassai | B62B 7/123 297/219.1 |
| 8,733,834 | B2 * | 5/2014 | Palmer | B60N 2/585 297/218.1 |
| 8,876,154 | B2 * | 11/2014 | Tracht | B60R 21/207 280/728.2 |

FOREIGN PATENT DOCUMENTS

| | | |
|---|---|---|
| FR | 2 837 151 B1 | 7/2004 |
| JP | H08-308675 A | 11/1996 |
| JP | H09104316 A | 4/1997 |
| JP | 2002-166766 A | 6/2002 |
| JP | 2002-173867 A | 6/2002 |
| JP | 2006-320611 A | 11/2006 |
| JP | 2013-56018 A | 3/2013 |
| JP | 2013-099996 A | 5/2013 |
| JP | 5520516 B2 | 6/2014 |

OTHER PUBLICATIONS

Written Opinion of the International Searching Authority in corresponding International Application No. PCT/JP2014/075678 dated Dec. 16, 2014, 3 pages.
Office Action dated Dec. 20, 2017, received in corresponding Japanese application No. 2016-549870, (2 pages) and English translation (3 pages).
Office Action dated Sep. 29, 2018 in corresponding Chinese application No. 201480082103.5 (7 pages) and English translation (7 pages).

* cited by examiner

SEAT FOR AUTOMOBILE

CROSS REFERENCE TO RELATED APPLICATIONS

The present application is a U.S. National Stage of International Application No. PCT/JP2014/075678 filed on Sep. 26, 2014, the entire disclosure of which is incorporated herein by reference.

TECHNICAL FIELD

The present invention relates to a seat to be mounted on an automobile, in particular a back board structure to be fixed on a back portion of a seat back.

BACKGROUND ART

The Patent Document 1 discloses the relevant seat for automobile. This related invention is one that is equipped with a wire that is provided nearly horizontally at a seat back frame and an engaging portion that is provided at a back board for engaging with the wire. The wire has left and right arm portions that are nearly parallel to each other at both ends of a straight portion. The engaging portion of the back board is formed to be capable of being mounted on the straight portion of the wire, and capable of engaging with the arm portions of the wire by utilizing its own elastic deformation.

PRIOR ART DOCUMENTS

Patent Documents

Patent Document 1: Japanese Patent Application Publication No. H8-308675

SUMMARY OF THE INVENTION

The back board itself is one in which one side of a base material such as urethane foam, that is a side to be a back side in a state of being installed on the seat back, is covered by a cover such as a synthetic resin film, and adhered to the base material by adhesive. To attach the back board itself to the seat back, there is a need to make a hole on the base material and the cover of the back board and screw the hole, or form a support portion of a resin hook on the base material of the back board and lock the hook. Also, before attaching the back board to the seat back, the cover has to be supported. As such, a work for attaching the back board to the seat back can be cumbersome and the manufacturing cost can rise.

The present invention has an object of providing an inexpensive seat for automobile, by improving a workability of attaching the back board to the seat back and making a folding of the back board easy.

The first aspect of the present invention is a seat for automobile in which a back board equipped with a base material and a cover for covering that base material is attached to a back side of a seat back, which has an essence in that the back board has a first region in which a first member of the base material is set, and a second region that is softer than the first region, and a coupling member for coupling the back board to the seat back is attached to the second region.

The second aspect of the present invention is a seat for automobile in which a back board equipped with a base material and a cover for covering that base material is attached to a back side of a seat back, which has an essence in that the back board has a first region on which a first member of the base material is set, and a second region that is softer than the first region, and a folding portion of the back board is provided at the second region.

A second member to be set in the second region is preferably formed by a member that is softer compared with the first member.

Also, a second member to be set in the second region is a member that is identical to that of the first member and formed to be thicker and softer than the first member by using a press that is weaker compared with that used for the first member.

Also, the base material may not be set but a gap may be set in the second region.

According to the above noted configuration, a thick and soft second member is formed at a terminal portion of the base material of the back board. To the second member, the coupling member for coupling the back board to the seat back can be attached easily by sewing. Also, as the coupling member is attached to the second member, there is no need to make a hole for attaching the coupling member on the base material and the cover of the back board. Moreover, it becomes unnecessary to form a support portion such as a resin hook on the base material of the back board. As a result, it is possible to reduce the manufacturing cost. Also, as the back board has the base material and the cover that are integrated by adhesive, it is possible to make an inexpensive seat for automobile.

Also, according to the above noted configuration, a soft second member is formed at the folding portion of the base material. Therefore, at a time of shaping the folding portion in a folded state, the second member functions as a hinge. As a result, a shaping by folding can be made easily at the second portion, and it is possible to make an inexpensive seat for automobile.

DETAILED DESCRIPTION OF THE INVENTION

Figure 1:
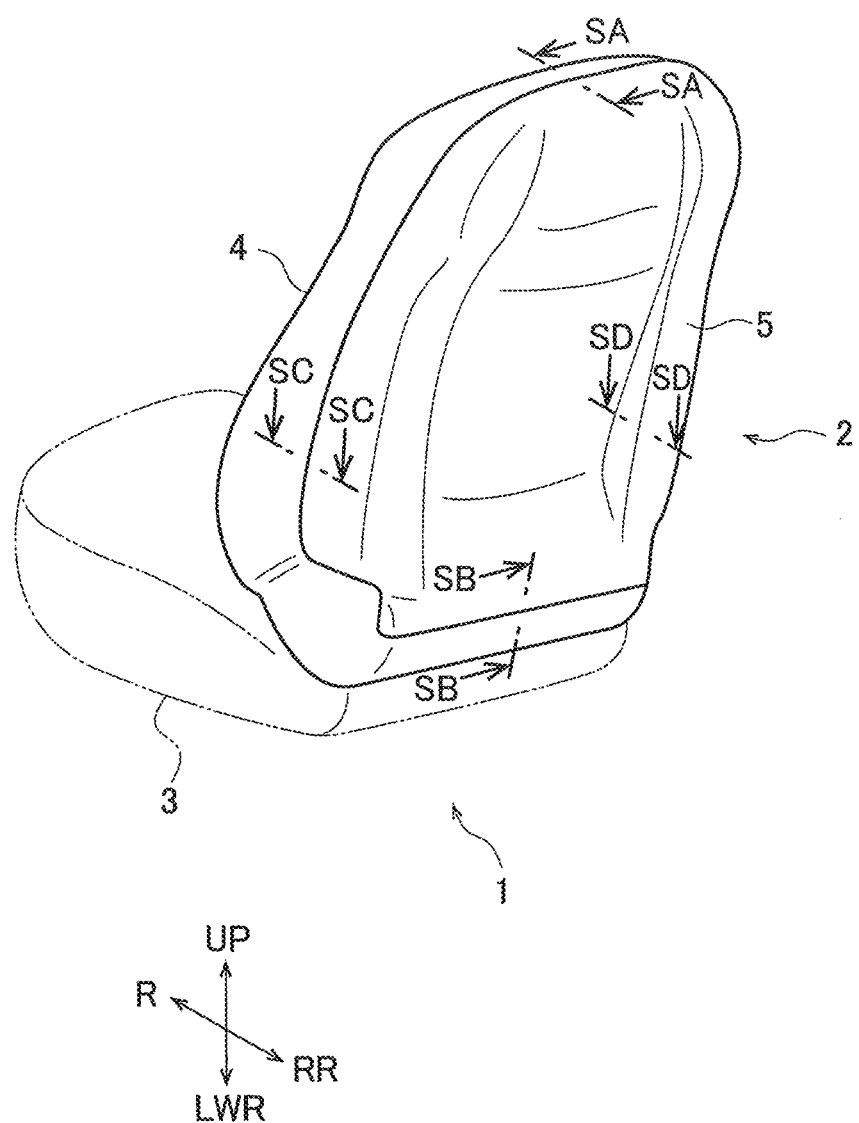
FIG. 1 is a perspective view of a seat for automobile and a back board according to an embodiment 1 of the present invention, viewed from a back side.

The object of providing an inexpensive seat for automobile, by improving a workability of attaching the back board to the seat back, is realized by the following configuration. Namely, it is a seat for automobile in which a back board equipped with a base material and a cover for covering that base material is attached to a back side of a seat back, wherein the back board has a first region in which a first member of the base material is set, and a second region that is softer than that first region, and a coupling member for coupling the back board to the seat back is attached to the second region.

Embodiment 1

In the following, a seat for automobile 1 according to the embodiment 1 of the present invention will be described, based on FIG. 1 to FIG. 9. The seat for automobile 1 is equipped with a seat back 2 and a seat cushion 3.

The seat back 2 is equipped with a seat back frame, a pad, a seat cover 4, and a back board 5. The seat back frame and the pad for covering the seat back frame are well-known so that they are omitted to be shown in the figures. The seat cover 4 is made of a cloth material for covering a front side FR of the pad. The back board 5 covers a back side RR of the seat cover 4 and the pad.

Figure 2:
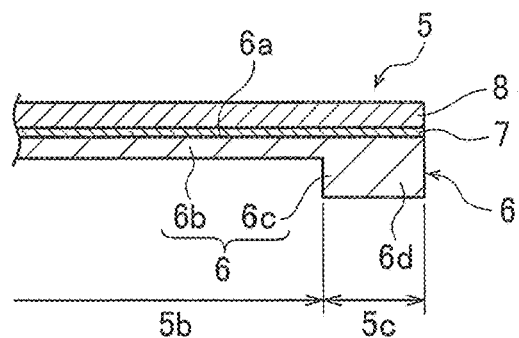
FIG. 2 is a general cross sectional view of the back board of FIG. 1.
Figure 4:
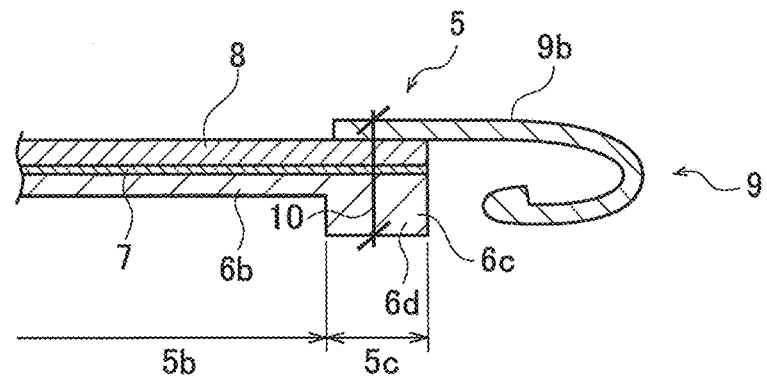
FIG. 4 is a cross sectional view along SB-SB line of FIG. 1.
Figure 5:
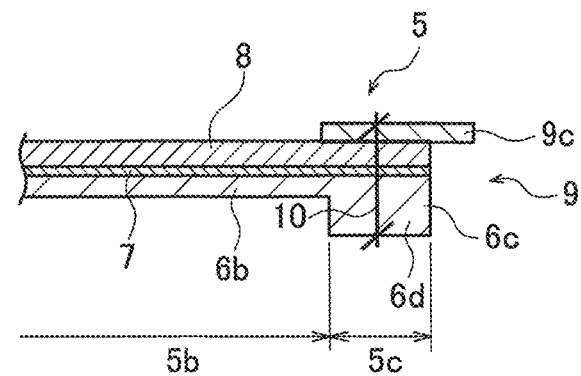
FIG. 5 is a cross sectional view along SC-SC line of FIG. 1.

As shown in FIG. 2, the back board 5 includes a base material 6 such as polyester or polyurethane foam, and a cover 8 adhered to a surface 6a of the base material 6 via an adhesive 7. The back board 5 has a first region 5b and a second region 5c. The first region 5b occupies a major part of the back board 5, and the second region 5c is provided at an end portion of the back board 5. The base material 6 has a first member 6b formed in the first region 5b, and a second member 6c formed in the second region 5c. The first member 6b is formed by applying a strong press on almost all sides of the base material 6. The second member 6c is formed by applying a weak press on a terminal portion 6d of the base material 6. To the second member 6c, a coupling member 9 such as a trim cover 9a shown in FIG. 3, a J hook 9b shown in FIG. 4, or a fastener 9c shown in FIG. 5 is attached by a sewing 10 and the like. The second member 6c is a part of the base material 6 that is formed to be thicker than the first member 6b by reducing a press amount by using the weak press, and set in a region of the terminal portion 6d to which the coupling member 9 is to be attached by the sewing 10 and the like.

Figure 6:
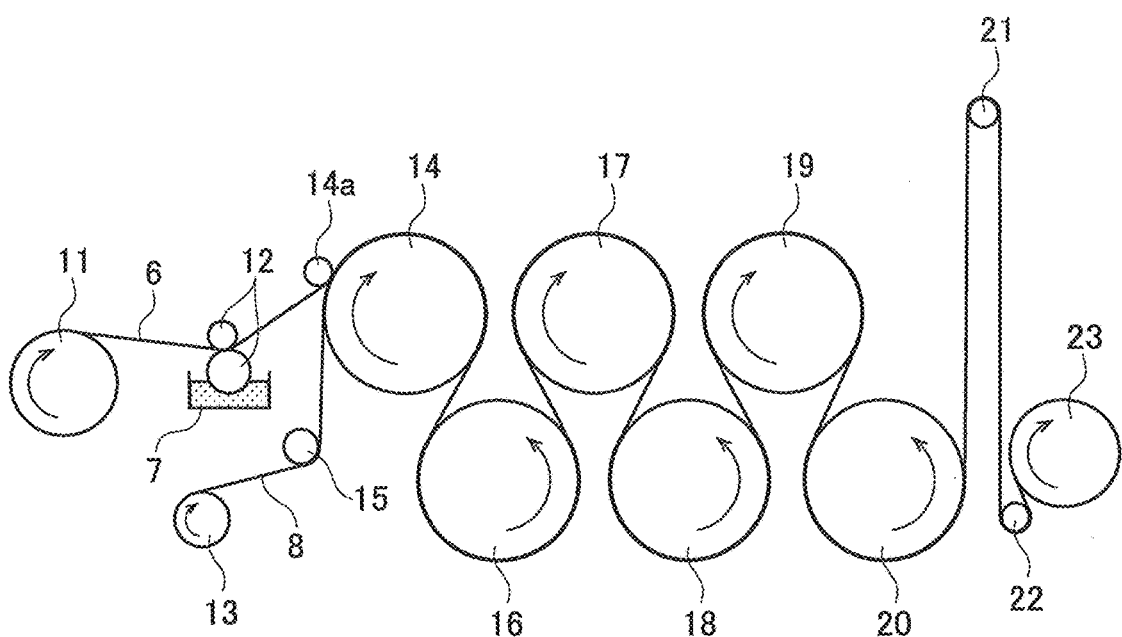
FIG. 6 is an explanatory figure showing an adhering process for a base material and a cover of the back board shown in FIG. 2.
Figure 7:
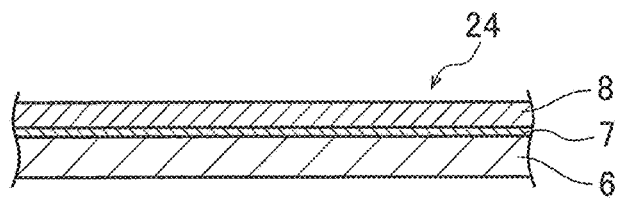
FIG. 7 is a partially broken cross sectional view of the back board formed according to FIG. 6.

The sheet shaped base material 6 rolled on a first roll 11 shown on a left end of FIG. 6 is rolled out from the first roll 11 and pulled into second rolls 12, 12, and the adhesive 7 is applied to one side of the base material 6. At a time of rolling the cover 8 rolled on a third roll 13 into fourth rolls 14, 14a via an intervening roll 15, the base material 6 with the adhesive 7 already applied thereto and the cover 8 are superposed. After that, the adhesive 7 is dried through drying cylinders 16, 17, 18, 19, 20. The sheet shaped base material 6 and the cover 8 that are integrated by the dried adhesive 7 are wound around a seventh roll 23, as a sheet shaped product 24 as shown in FIG. 7, via fifth and sixth rolls 21, 22. In FIG. 6, arrows shown in respective rolls 11, 13, 14, 23 and drying cylinders 16, 17, 18, 19, 20 are indicating respective rotational directions in simple manners.

Figure 8:
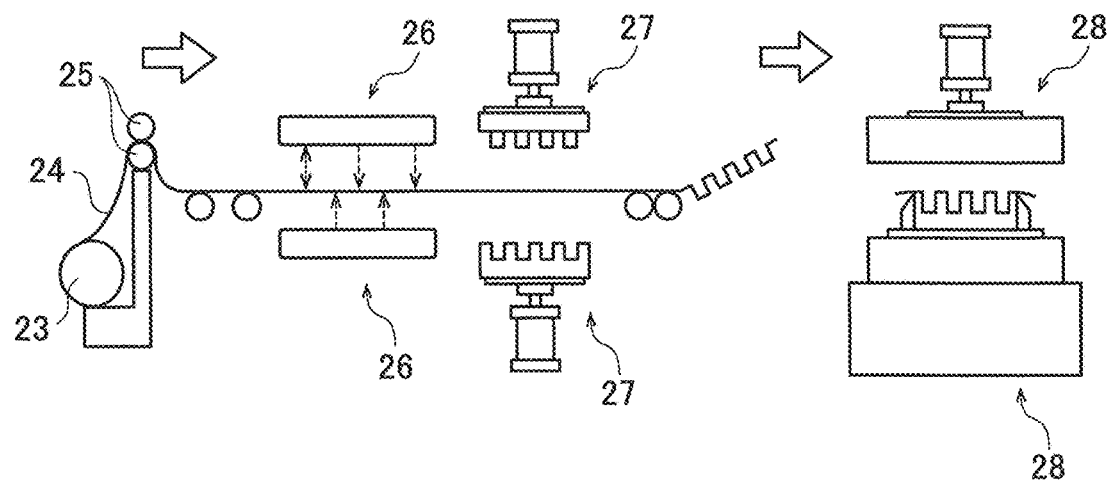
FIG. 8 is an explanatory figure showing a shaping processing process from a sheet shaped back board formed according to FIG. 6 to a back board capable of being attached to the seat.
Figure 9:
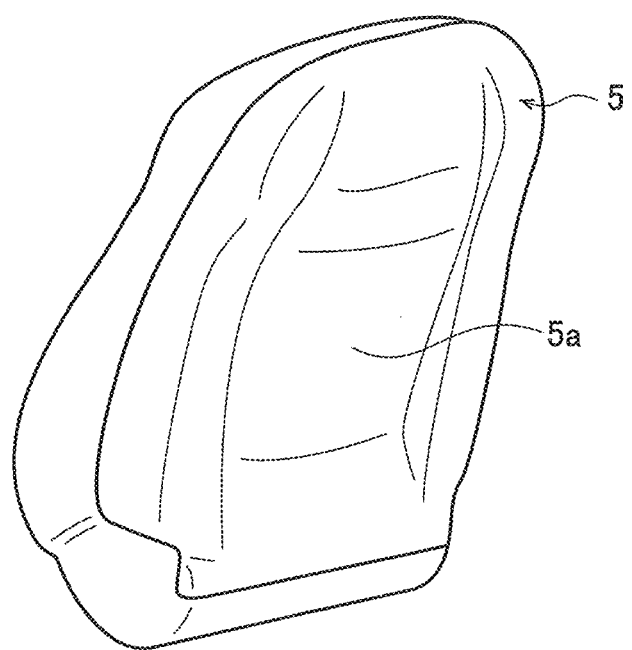
FIG. 9 is a perspective view of a single item of the back board shaped according to FIG. 8.

Next, as shown in FIG. 8, the sheet shaped product 24 would around the seventh roll 23 is made more flexible by heating devices 26 such as ceramic heaters, via eighth rolls 25, 25. Next, the first member 6b is formed by the strong press and the second member 6c is formed by the weak press, while they are bent in an appropriate shape, using shaping devices 27, 27. They are then cut into a size of the back board 5 by cutting devices 28, 28, to form the back board 5 as shown in FIG. 9. In the back board 5 shown in FIG. 9, a concave portion 5a is provided in order to enlarge a space around knees of a passenger to be seated on a seat arranged to be on a back side RR of the seat for automobile 1.

Figure 3:
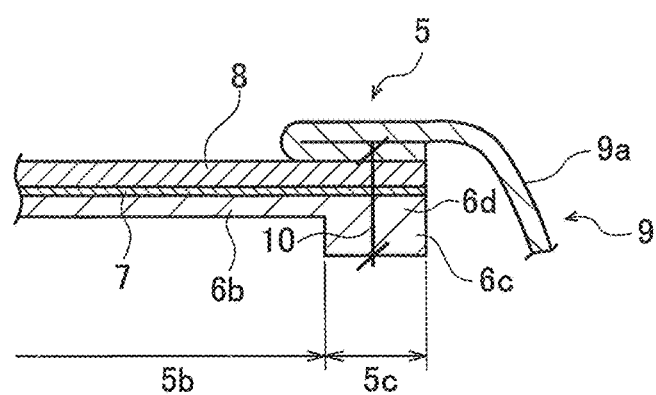
FIG. 3 is a cross sectional view along SA-SA line of FIG. 1.

The back board 5 will be described in further detail. As shown in FIG. 2, the first member 6b that is strongly pressed by the shaping devices 27, 27 will be thin but hard, so that a prescribed cross sectional shape is maintained. However, the first member 6b will be so hard that a needle cannot be entered at a time of the sewing 10. On the other hand, the second member 6c that is weakly pressed will be thick as a press amount is small, so that a soft state is maintained. Consequently, as shown in FIG. 3, the trim cover 9a can be attached easily by the sewing 10. Else, as shown in FIG. 4, the J hook 9b can be attached easily by the sewing 10. Else, as shown in FIG. 5, the fastener 9c can be attached easily by the sewing 10.

In the embodiment 1, the thick and soft second member 6c is formed at the terminal portion 6d of the base material 6 of the back board 5. To the second member 6c, the coupling member 9 for coupling the back board 5 to the seat back 2 can be attached easily by the sewing 10. Also, as the coupling member 9 is attached to the second member 6c, there is no need to make a hole for attaching the coupling member 9, on the base material 6 and the cover 8 of the back board 5. Moreover, there is no need to form a support portion such as a resin hook on the base material 6 of the back board 5. As a result, it is possible to reduce the manufacturing cost. Also, the back board 5 has the base material 6 and the cover 8 that are integrated by the adhesive 7, so that it is possible to make the seat for automobile 1 to be inexpensive.

Embodiment 2

In the following, a seat for automobile 1 according to the embodiment 2 of the present invention will be described, based on FIG. 10 and FIG. 11. The seat for automobile 1 is equipped with a seat back 2 and a seat cushion 3. The seat back 2 is equipped with a seat back frame, a pad, a seat cover 4, and a back board 30. The seat back 2 according to the embodiment 2 differs from the embodiment 1 in that it has the back board 30 for covering the seat cover 4 and a back side RR of the pad, instead of the seat board 5. The rest is similar to the embodiment 1.

Figure 10:
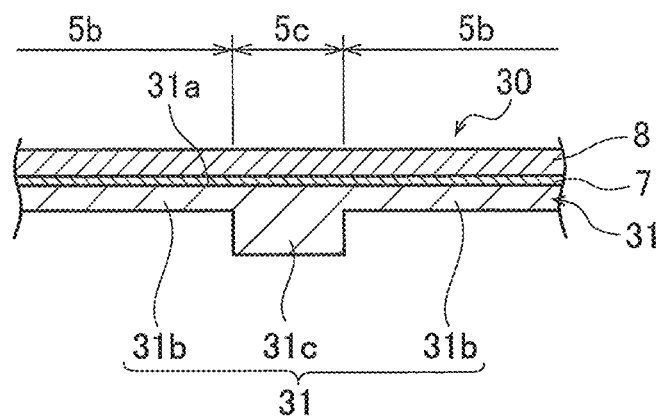
FIG. 10 is a general cross sectional view corresponding to FIG. 2 of the back board according to an embodiment 2 of the present invention.
Figure 11:
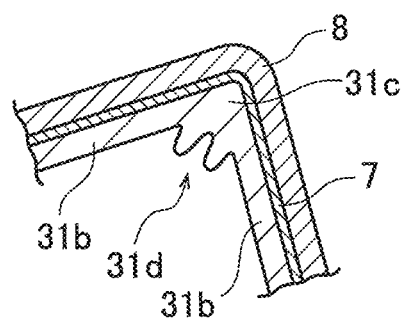
FIG. 11 is a cross sectional view showing the back board shown in FIG. 10 in a state of being folded.

As shown in FIG. 10, the back board 30 includes a base material 31 such as polyurethane foam, and a cover 8 of a synthetic resin film adhered to a surface 31a of the base material 31 via an adhesive 7. The back board 30 has a first region 5b and a second region 5c. The first region 5b occupies a major part of the back board 30, and the second region 5c is provided at a central portion of the back board 30. The base material 31 has a first member 31b formed in the first region 5b, and a second member 31c formed in the second region 5c. The first member 31b is formed by applying a strong press on almost all sides of the base material 31. The second member 31c is formed by applying a weak press on a folding portion 31d of the base material 31. As shown in FIG. 11, the second member 31c has a function as a hinge at a time of folding. The second member 31c is a lump of material such as polyurethane foam itself that is formed to be thicker than the first member 31b by reducing a press amount by using the weak press, and set in a region of the folding portion 31d that is shaped by folding.

In the back board 30 according to the embodiment 2, the second member 31c is formed by applying the weak press on the folding portion 31d of the base material 31. Therefore, the second member 31c is thick as the press amount is reduced, but maintained to be in a soft state. At a time of shaping the folding portion 31d to be in a folded state, the second member 31c functions as a hinge. As a result, it can be shaped by folding easily at the second member 31c, so that it is possible to make the seat for automobile 1 to be inexpensive.

Embodiment 3

In the following, a seat for automobile 1 according to the embodiment 3 of the present invention will be described, based on FIG. 12 to FIG. 15. The seat for automobile 1 is equipped with a seat back 2 and a seat cushion 3. The seat back 2 is equipped with a seat back frame, a pad, a seat cover 4, and a back board 35. The seat back 2 according to the embodiment 3 differs from the embodiment 1 in that it has the back board 35 for covering the seat cover 4 and a back side RR of the pad, instead of the seat board 5. The rest is similar to the embodiment 1.

Figure 12:
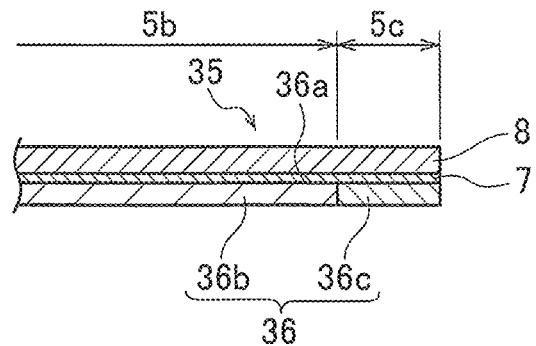
FIG. 12 is a general cross sectional view corresponding to FIG. 2 of the back board according to an embodiment 3 of the present invention.
Figure 13:
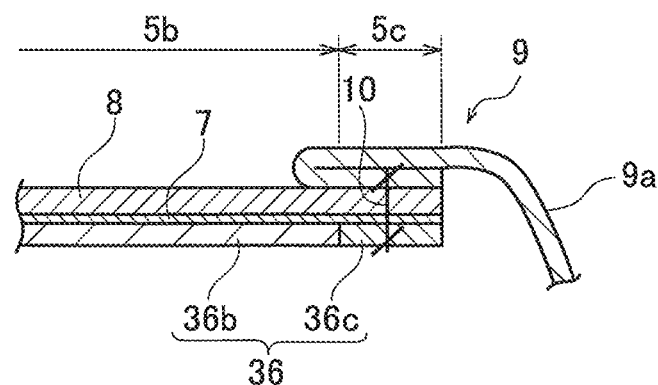
FIG. 13 is a cross sectional view corresponding to FIG. 3 according to FIG. 12.
Figure 14:
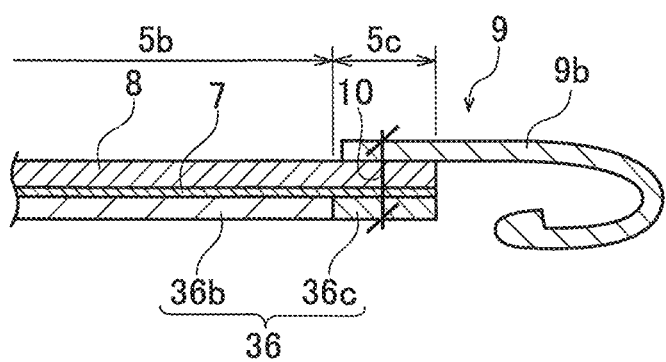
FIG. 14 is a cross sectional view corresponding to FIG. 4 according to FIG. 12.
Figure 15:
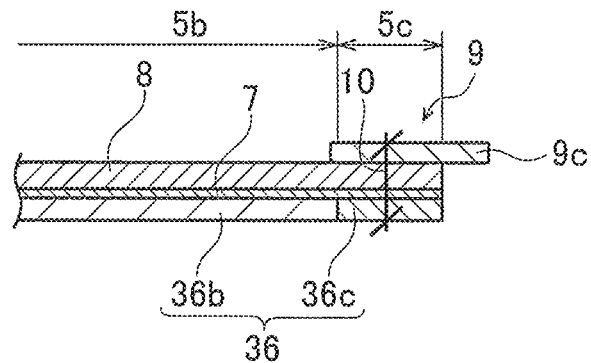
FIG. 15 is a cross sectional view corresponding to FIG. 5 according to FIG. 12.

As shown in FIG. 12, the back board 35 includes a base material 36 such as polyurethane foam, and a cover 8 of a synthetic resin film adhered to a surface 36a of the base material 36 via an adhesive 7. The back board 35 has a first region 5b and a second region 5c. The first region 5b occupies a major part of the back board 35, and the second region 5c is provided at an end portion of the back board 35. The base material 36 has a first member 36b and a second member 36c. The first member 36b is formed on almost all portions of the base material 36, and hard. The second member 36c is formed on a terminal portion 36d of the base material 36, and made to be soft by reducing a density of material such as polyurethane foam. To the second member 36c, a coupling member 9 such as a trim cover 9a shown in FIG. 13, a J hook 9b shown in FIG. 14, or a fastener 9c shown in FIG. 15 is attached by a sewing 10. The second member 36c is a lump of material such as polyurethane foam itself that is formed to be softer than the first member 36b by reducing a press amount by using the weak press, and set in a region of the terminal portion 36d to which the coupling member 9 is to be attached by the sewing 10 and the like.

In the embodiment 3, the second member 36c comprised of a low density material is formed at the terminal portion 36d of the base material 36 of the back board 35. As the second member 36c is soft, the coupling member 9 for coupling the back board 35 to the seat back 2 can be attached easily. Also, as the coupling member 9 is attached to the second member 36c, there is no need to make a hole for attaching the coupling member 9, on the base material 36 and the cover 8 of the back board 35. Moreover, there is no need to form a support portion such as a resin hook on the base material 36 of the back board 35. As a result, it is possible to reduce the manufacturing cost. Also, the back board 35 has the base material 36 and the cover 8 that are integrated by the adhesive 7, so that it is possible to make the seat for automobile 1 to be inexpensive.

Embodiment 4

In the following, a seat for automobile 1 according to the embodiment 4 of the present invention will be described, based on FIG. 16 and FIG. 17. The seat for automobile 1 is equipped with a seat back 2 and a seat cushion 3. The seat back 2 is equipped with a seat back frame, a pad, a seat cover 4, and a back board 40. The seat back 2 according to the embodiment 4 differs from the embodiment 1 in that it has the back board 40 for covering the seat cover 4 and a back side RR of the pad, instead of the seat board 5. The rest is similar to the embodiment 1.

Figure 16:
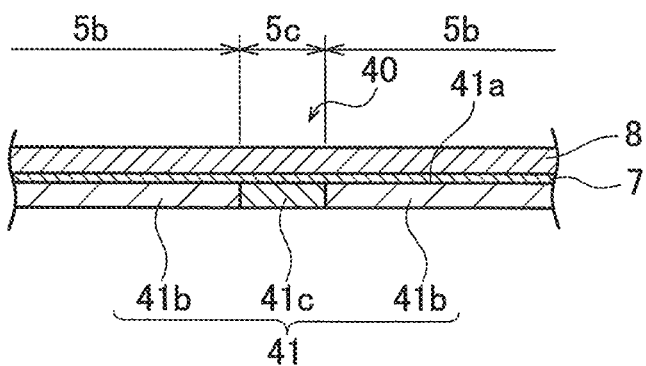
FIG. 16 is a general cross sectional view corresponding to FIG. 2 of the back board according to an embodiment 4 of the present invention.
Figure 17:
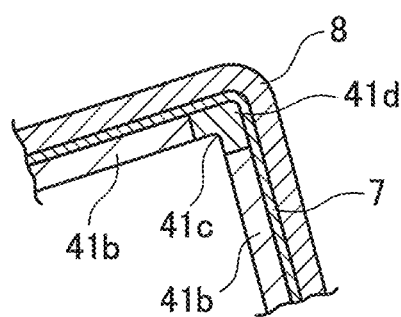
FIG. 17 is a cross sectional view showing the back board shown in FIG. 16 in a state of being folded.

As shown in FIG. 16, the back board 40 includes a base material 41 such as polyurethane foams, and a cover 8 of a synthetic resin film adhered to a surface 41a of the base material 41 via an adhesive 7. The back board 40 has a first region 5b and a second region 5c. The first region 5b occupies a major part of the back board 40, and the second region 5c is provided at a central portion of the back board 40. The base material 41 has a first member 41b and a second member 41c. The first member 41b is formed on almost all portions of the base material 41, and hard. The second member 41c is formed on a folding portion 41d of the base material 41, and made to be soft by reducing a density of material such as polyurethane foam. As shown in FIG. 17, the second member 41c functions as a hinge at a time of folding. The second member 41c is a lump of material such as polyurethane foam itself that is formed to be softer than the first member 41b by reducing a press amount by using the weak press, and set in a region of the folding portion 41d that is shaped by folding.

In the back board 40 according to the embodiment 4, the second member 41c is formed by using a low density material at the folding portion 41d of the base material 41. As the second member 41c is soft, at a time of shaping the folding portion 41d to be in a folded state, the second member 41c functions as a hinge. As a result, it can be shaped by folding easily at the second member 41c, so that it is possible to make the seat for automobile 1 to be inexpensive.

Embodiment 5

In the following, a seat for automobile 1 according to the embodiment 5 of the present invention will be described, based on FIG. 18 to FIG. 21. The seat for automobile 1 is equipped with a seat back 2 and a seat cushion 3. The seat back 2 is equipped with a seat back frame, a pad, a seat cover 4, and a back board 45. The seat back 2 according to the embodiment 5 differs from the embodiment 1 in that it has the back board 45 for covering the seat cover 4 and a back side RR of the pad, instead of the seat board 5. The rest is similar to the embodiment 1.

Figure 18:
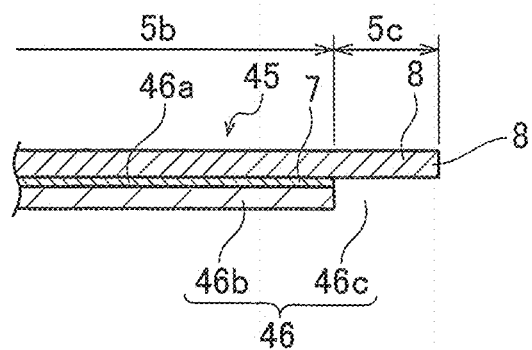
FIG. 18 is a general cross sectional view corresponding to FIG. 2 of the back board according to an embodiment 5 of the present invention.
Figure 19:
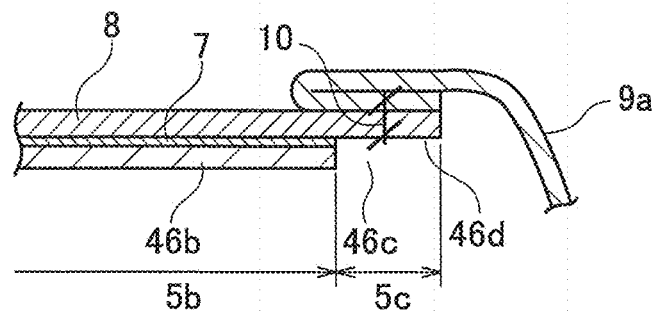
FIG. 19 is a cross sectional view corresponding to FIG. 3 according to FIG. 18.
Figure 20:
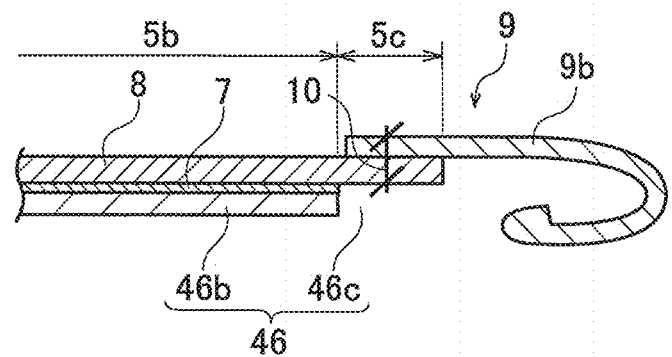
FIG. 20 is a cross sectional view corresponding to FIG. 4 according to FIG. 18.
Figure 21:
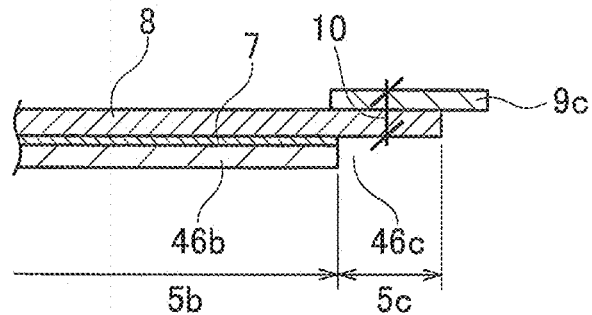
FIG. 21 is a cross sectional view corresponding to FIG. 5 according to FIG. 18.

As shown in FIG. 18, the back board 45 includes a base material 46 such as polyurethane foam, and a cover 8 of a synthetic resin film adhered to a surface 46a of the base material 46 via an adhesive 7. The back board 45 has a first region 5b and a second region 5c. The first region 5b occupies a major part of the back board 45, and the second region 5c is provided at an end portion of the back board 45. The base material 46 is formed in the first region 5b, and thin and hard. The base material 46 is not set in the second region 5c, so that it corresponds to a gap. To the second region 5c, a coupling member 9 such as a trim cover 9a shown in FIG. 19, a J hook 9b shown in FIG. 20, or a fastener 9c shown in FIG. 21 is attached to the cover 8 by a sewing 10.

In the embodiment 5, the hard base material 46 is not set in the second region 5c of the back board 45. For this reason, the coupling member 9 for coupling the back board 45 to the seat back 2 can be attached to the cover 8 easily by the sewing 10. Also, as the coupling member 9 is attached to the cover 8 by the sewing 10, there is no need to make a hole for attaching the coupling member 9, on the cover 8. Moreover, there is no need to form a support portion such as a resin hook on the back board 45. As a result, it is possible to reduce the manufacturing cost. Also, the back board 45 has the base material 46 and the cover 8 that are integrated by the adhesive 7, so that it is possible to make the seat for automobile 1 to be inexpensive.

Embodiment 6

In the following, a seat for automobile 1 according to the embodiment 6 of the present invention will be described, based on FIG. 22 and FIG. 23. The seat for automobile 1 is equipped with a seat back 2 and a seat cushion 3. The seat back 2 is equipped with a seat back frame, a pad, a seat cover 4, and a back board 50. The seat back 2 according to the embodiment 6 differs from the embodiment 1 in that it has the back board 50 for covering the seat cover 4 and a back side RR of the pad, instead of the seat board 5. The rest is similar to the embodiment 1.

Figure 22:
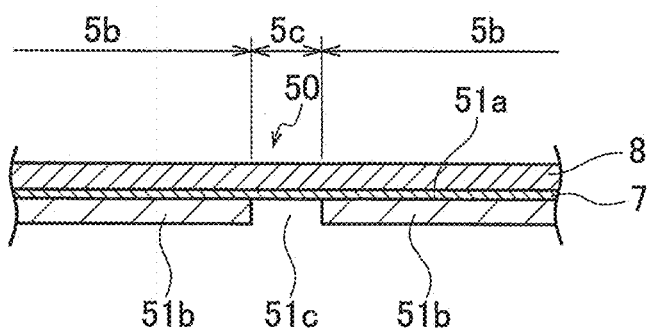
FIG. 22 is a general cross sectional view corresponding to FIG. 2 of the back board according to an embodiment 6 of the present invention.
Figure 23:
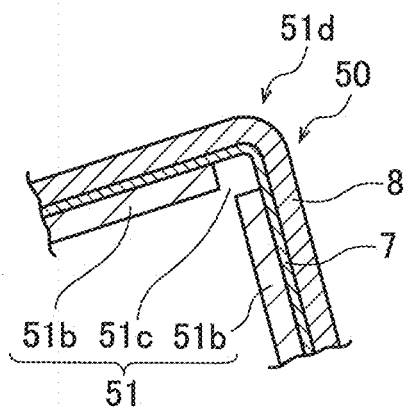
FIG. 23 is a cross sectional view showing the back board shown in FIG. 22 in a state of being folded.

As shown in FIG. 22, the back board 50 includes a base material 51 such as polyurethane foam, and a cover 8 of a synthetic resin film adhered to a surface 51a of the base material 51 via an adhesive 7. The back board 50 has a first region 5b and a second region 5c. The first region 5b occupies a major part of the back board 50, and the second region 5c is provided at a central portion of the back board 50. The base material 51 is formed in the first region 5b, and thin and hard. The base material 51 is not set in the second region 5c, so that it corresponds to a gap. The folding portion 5d is a gap, and no hard member is set there, so that as shown in FIG. 23, it functions as a hinge at a time of folding.

In the back board 50 according to the embodiment 6, the base material 51 is not set in the second region 5c of the back board 50 corresponding to the folding portion 51d. At a time of shaping the folding portion 51d to be in a folded state, a gap corresponding to the second region 5c functions as a hinge. As a result, it can be shaped by folding easily at the second region 5c, so that it is possible to make the seat for automobile 1 to be inexpensive.

In the above, the embodiments of the present invention have been described, but the present invention is not to be limited to the above noted embodiments, and various modifications are possible.

The invention claimed is:

1. A seat for automobile comprising:
   a back board equipped with a base material and a cover for covering the base material attached to a back side of a seat back,
   wherein the back board has a first region in which a first part of the base material is set and a second region in which a second part of the base material is set,
   the second part of the base material is less pressed than the first part of the base material to be thicker and softer than the first part of the base material, and
   a coupling member for coupling the back board to the seat back is attached to the second region.

2. A seat for automobile comprising:
   a back board equipped with a base material and a cover for covering the base material attached to a back side of a seat back,
   wherein the back board has a first region on which a first part of the base material is set and a second region in which a second part of the base material is set,
   the second part of the base material is less pressed than the first part of the base material to be thicker and softer than the first part of the base material, and
   a folding portion of the back board is provided at the second regions.

3. A method of manufacturing a seat for an automobile having a back board equipped with a base material and a cover for covering the base material attached to a back side of a seat back, the method comprising:
   providing the back board with a first region and a second region;
   combining the base material and the cover;
   applying a first press on a first part of the base material in the first region;
   applying a second press, weaker than the first press, on a second part of the base material in the second region; and
   attaching a coupling member for coupling the back board to the seat back to the second region.

4. The method according to claim 3, further comprising forming the second part of the base material thicker and softer than the first part of the base material.

5. A method of manufacturing a seat for an automobile having a back board equipped with a base material and a cover for covering the base material attached to a back side of a seat back, the method comprising:
   providing the back board with a first region and a second region;
   combining the base material and the cover;
   applying a first press on a first part of the base material in the first region;
   applying a second press, weaker than the first press, on a second part of the base material in the second region; and
   providing a folding portion of the back board at the second region.

6. The method according to claim 5, further comprising forming the second part of the base material thicker and softer than the first part of the base material.

* * * * *